(12) United States Patent  (10) Patent No.: US 8,247,110 B2
Li  (45) Date of Patent: Aug. 21, 2012

(54) BATTERY COVER LATCHING MECHANISM

(75) Inventor: Chang-Zhi Li, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 407 days.

(21) Appl. No.: 12/538,263

(22) Filed: Aug. 10, 2009

(65) Prior Publication Data

US 2010/0081045 A1 Apr. 1, 2010

(30) Foreign Application Priority Data

Sep. 26, 2008 (CN) .......................... 2008 10 304700

(51) Int. Cl.
 *H01M 2/08* (2006.01)
 *H01M 2/10* (2006.01)
(52) U.S. Cl. ............ 429/175; 429/96; 429/97; 429/100; 429/186

(58) Field of Classification Search .................... 429/97, 429/100, 175, 96, 186; 292/163
See application file for complete search history.

(56) References Cited

U.S. PATENT DOCUMENTS 4,074,017 A * 2/1978 Kinsey ............................... 429/1
4,160,857 A * 7/1979 Nardella et al. ................ 429/97
5,372,395 A * 12/1994 Yang ............................. 292/147
6,929,878 B2 * 8/2005 Chen et al. .................... 429/100

* cited by examiner

*Primary Examiner* — Patrick Joseph Ryan
*Assistant Examiner* — Julian Anthony
(74) *Attorney, Agent, or Firm* — Altis Law Group, Inc.

(57) ABSTRACT

A battery cover latching mechanism is provided. The battery cover latching mechanism includes a body member defining a battery receiving space, a battery cover attached to the body member to cover the battery receiving space, and a button assembly. The battery cover including a clamping portion. The button assembly includes a button. The button includes a latching portion. The latching portion releasbly locks the latching portion to the clamping portion.

18 Claims, 6 Drawing Sheets

BATTERY COVER LATCHING MECHANISM

BACKGROUND

1. Technical Field

The present disclosure relates to battery cover latching mechanisms and, particularly, to a battery cover latching mechanism used in a portable electronic device.

2. Description of Related Art

Batteries are used to provide power to portable electronic devices, e.g., mobile phones. Battery cover latching assemblies are usually provided to secure battery within portable electronic devices.

A typical battery cover latching assembly for an electronic device usually includes a battery cover and latching means, e.g., a locking pin latching into a locking hole. The battery cover can be detachably mounted to a housing of portable electronic devices using the latching means.

However, removal of the battery cover may require a strong force, which may damage the locking pin.

Therefore, there is room for improvement within the art.

BRIEF DESCRIPTION OF THE DRAWINGS

Many aspects of the battery cover latching mechanism can be better understood with reference to the following drawings. These drawings are not necessarily drawn to scale, the emphasis instead being placed upon clearly illustrating the principles of the present battery cover latching mechanism. Moreover, in the drawings like reference numerals designate corresponding sections throughout the several views.

DETAILED DESCRIPTION

Figure 1:
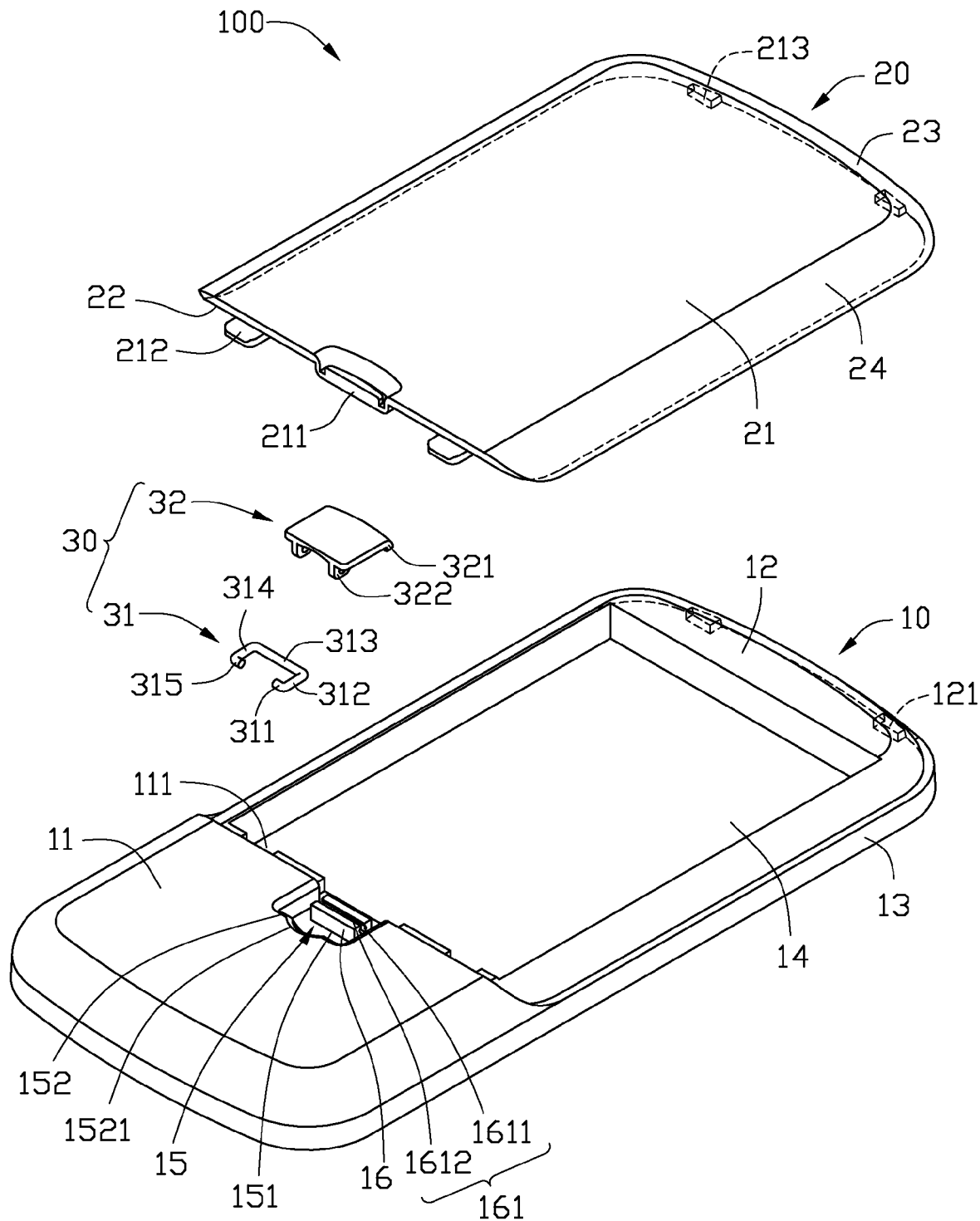
FIG. 1 is an exploded, isometric view of a battery cover latching mechanism, in accordance with an exemplary embodiment.

FIG. 1 shows an exemplary battery cover latching mechanism 100 including a body member 10, a battery cover 20, and a button assembly 30. The battery cover 20 is placed on the body member 10. The button assembly 30 is rotatably attached to the body member 10, and is used to releasably lock the battery cover 20 to the body member 10.

The body member 10 can be a housing of a portable electronic device. The body member 10 includes a top portion 11, a bottom portion 12 opposite to the top portion 11, and two opposite sidewalls 13. The two sidewalls 13 connect the top portion 11 and the bottom portion 12 to surround a battery receiving space 14. The top portion 11 defines two first limiting slots 111 communicating with the battery receiving space 14. The top portion 11 further includes a cavity 15 defined between the two limiting slots 111, communicating with the battery receiving space 14. The cavity 15 is defined by a bottom wall 151 and a sidewall 152. The body member 10 further includes two latching protrusions 16 protruding from the bottom wall 151. The two latching protrusions 16 are parallel and a latching slot 161 is defined therebetween. In this embodiment, the latching slot 161 includes a pivoting slot 1611 and an inserting slot 1612 communicating with the pivoting slot 1611. The pivoting slot 1611 is used to rotatably attach the button assembly 30 to the body member 10. A width of the inserting slot 1612 is smaller than the pivoting slot 1611. The inserting slot 1612 is a narrow opening, through which the button assembly 30 is inserted into the pivoting slot 1611. The sidewall 152 defines a concave surface 1521. The concave surface 1521 facilitates catching the button assembly 30 received in the cavity 15. The bottom portion 12 of the body member 10 includes two second limiting slots 121 defined therein facing away from the battery receiving space 14.

The battery cover 20 is used to enclose the battery receiving space 14. The battery cover 20 includes a main section 21, a first end 22, an opposite second end 23, and two opposite sidewalls 24. The main section 21 includes a clamping portion 211. The main section 21 is partially recessed adjacent to the first end 22 to form the clamping portion 211 for latching the battery cover 20 to the body member 10. Two tabs 212 are formed on the main section 21 adjacent to the first end 22, and are used to insert into the first limiting slots 111. Two limiting blocks 213 are formed on the main section 21 adjacent to the second end 23, and are used to insert into the second limiting slots 121.

Figure 2:
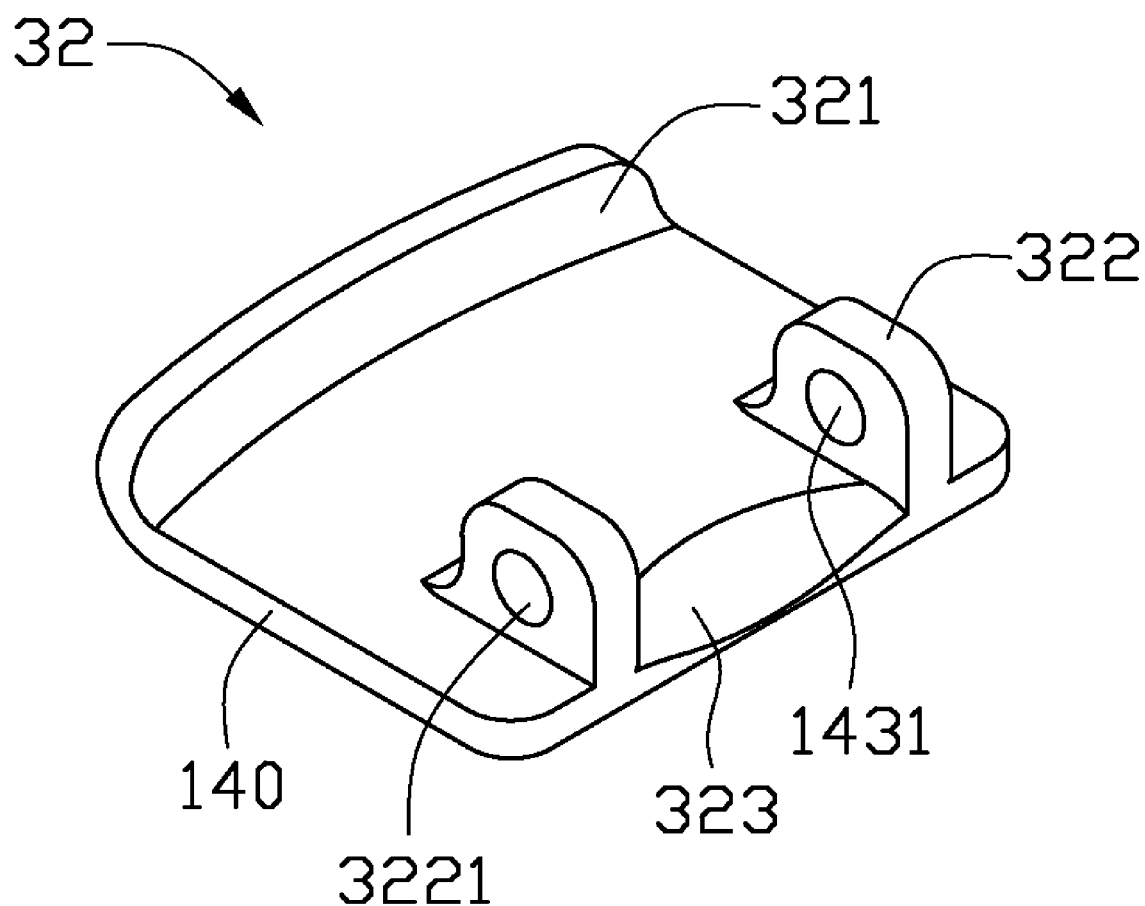
FIG. 2 is an enlarged, isometric view of the button of FIG. 1.

Referring to FIGS. 1 and 2 together, the button assembly 30 includes a connecting member 31 and a button 32. In this embodiment, the connecting member 31 is a pivoting shaft, and the pivoting shaft 31 is generally a bent bar. The pivoting shaft 31 includes a head portion 311, a first connecting portion 312, a mounting portion 313, a second connecting portion 314, and a tail portion 315. The first connecting portion 312 is parallel with the second connecting portion 314. The mounting portion 313 perpendicularly connects one end of the first connecting portion 312 and one end of the second connecting portion 314 together, forming a U-shaped shelf. The head portion 311 perpendicularly connects to the other end of the first connecting portion 312. The tail portion 315 perpendicularly connects to the other end of the second connecting portion 314 towards the head portion 311. The mounting portion 313 is rotatably received in the pivoting slot 1611 through the inserting slot 1612. The head portion 311 and the tail portion 315 are rotatably mounted to the button 32, such that the button 32 can rotate about the head portion 311 and the tail portion 315. Thus, the pivoting shaft 31 can rotate about the mounting portion 313 together with the button 32. The button 32 includes a latching portion 321 formed at one end thereof, and two ribs 322 formed at an opposite end. Each rib 322 defines a pivoting hole 3221. The two pivoting ribs 322 are opposite to each other, and the two pivoting holes 3221 are coaxial. The head portion 311 and the tail portion 315 are respectively inserted into a pivoting hole 3221. The button 32 defines a notch 323. The notch 323 is arced and cooperates with the concave surface 1521 to facilitate catching the button assembly 30.

Figure 3:
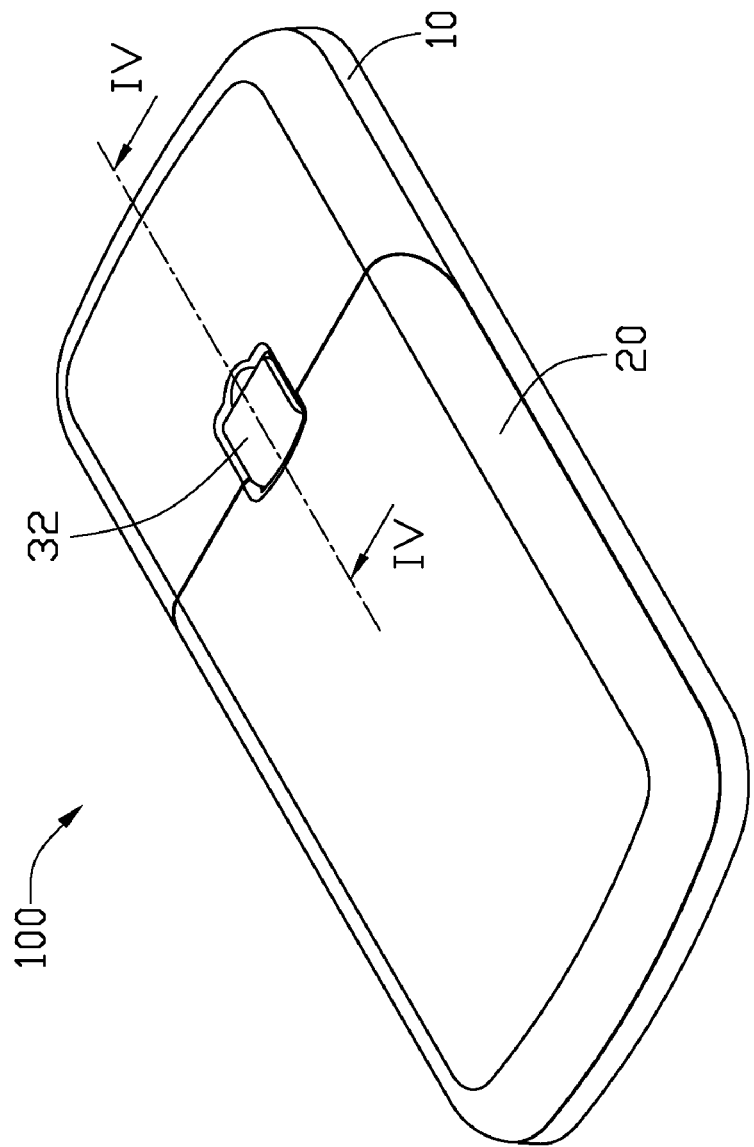
FIG. 3 is an assembled view of the battery cover latching mechanism of FIG. 1.

Referring to FIG. 3, to mount the button assembly 30 to the body member 10, the head portion 311 and the tail portion 315 of the pivoting shaft 31 are respectively inserted into one pivoting hole 3221 of the button 32. Then the mounting portion 313 of the pivoting shaft 31 is inserted into the pivoting slot 1611. Thus, the button 32 can rotate about the head portion 311 and the tail portion 315. The pivoting shaft 31 can rotate about the mounting portion 313.

Figure 4:
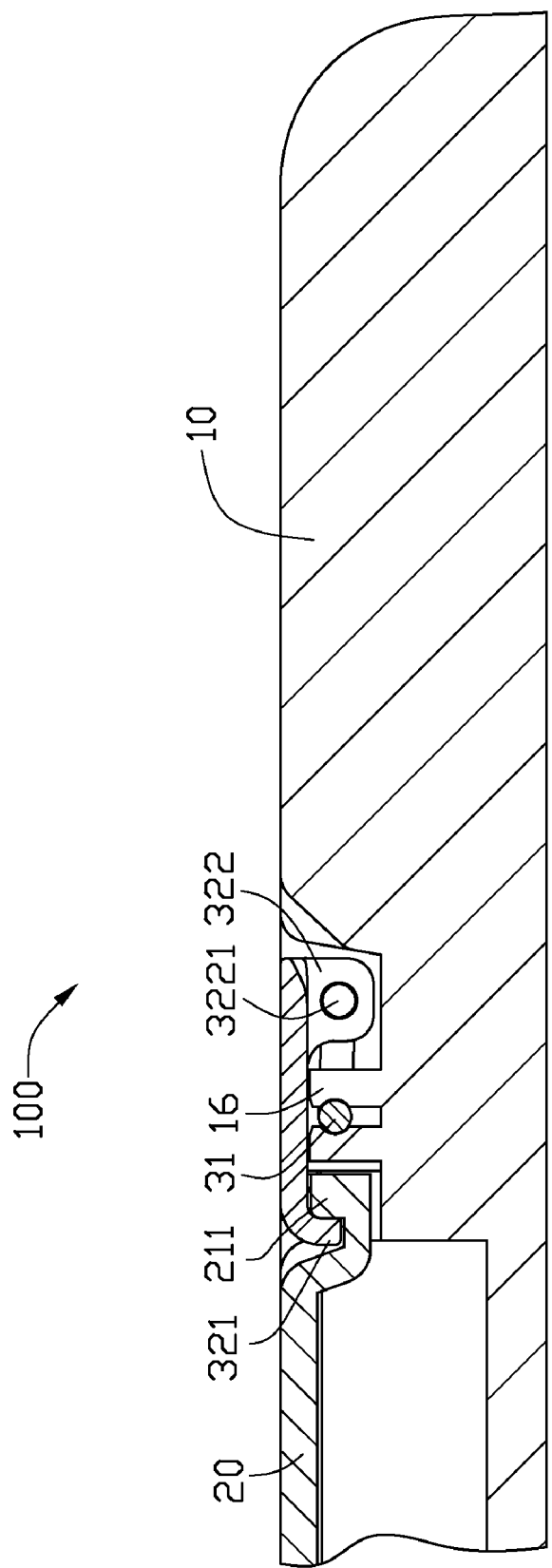
FIG. 4 is a cut-view of the battery cover latching mechanism shown in FIG. 3 taken along line IV-IV.
Figure 5:
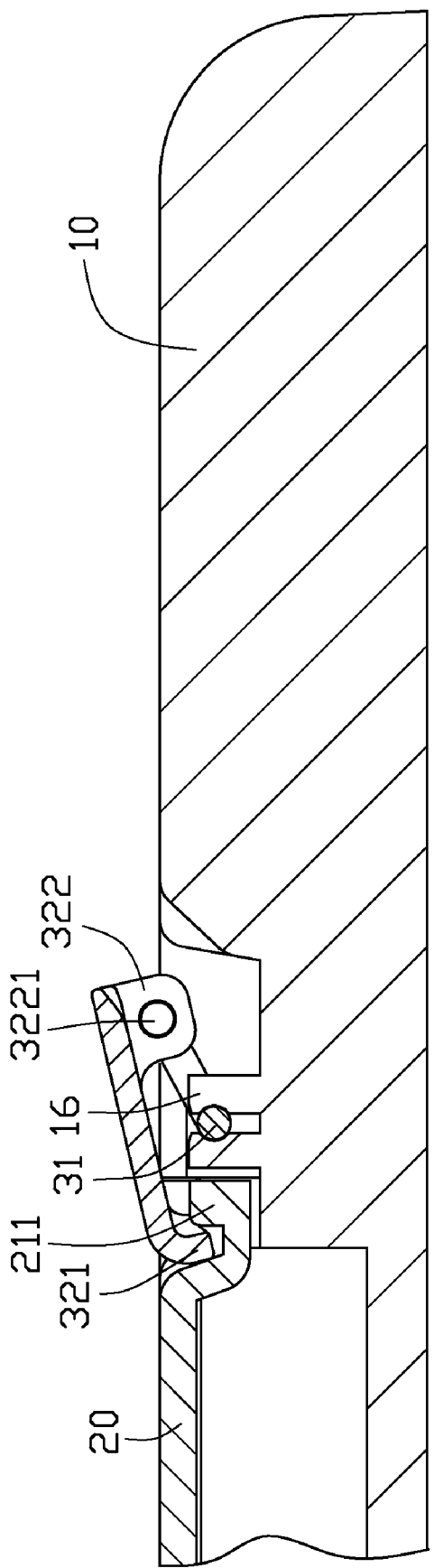
FIG. 5 is a schematic view showing a working status of the battery cover latching mechanism shown in FIG. 4.
Figure 6:
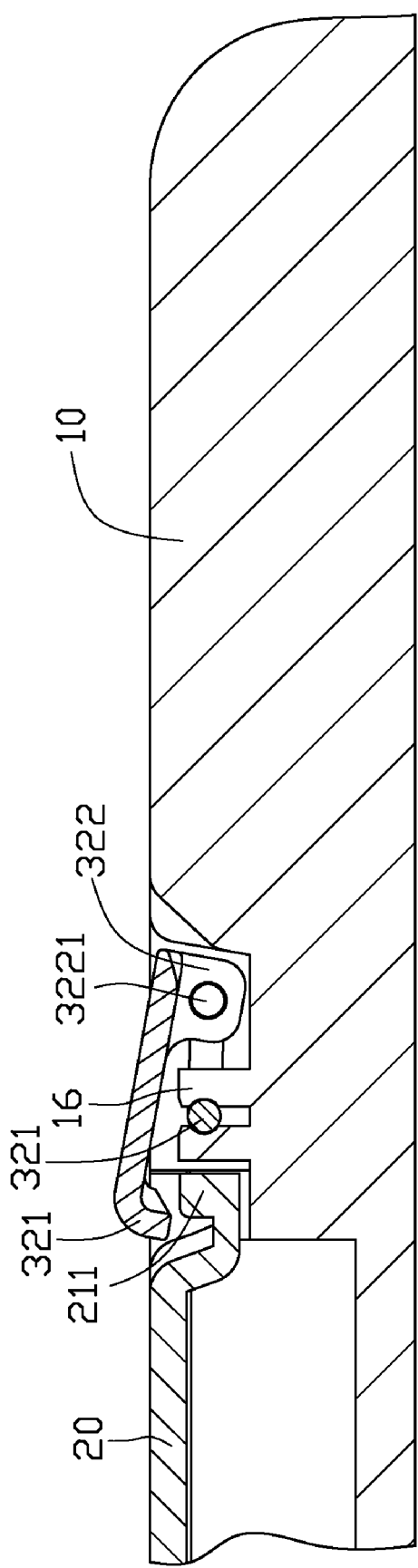
FIG. 6 is similar to FIG. 5, but showing another working status of the battery cover latching mechanism shown in FIG. 4.

Referring to FIGS. 4 and 5, to mount the battery cover 20 to the body member 10, the battery cover 20 is generally placed over the battery receiving space 14, with the first end 22 facing the top portion 11 of the body member 10. The battery cover 20 is pushed towards the top portion 11 until the tabs 212 latches into the first limiting slots 111, and the limiting blocks 213 latch into the second limiting slots 121. Then, the button 32 is rotated about the head portion 311 and the tail portion 315, i.e., a first axis, and the pivoting shaft 31 is rotated about the mounting portion 313, i.e., a second axis to make the latching portion 321 goes over the clamping portion 211. At this time, the ribs 322 of the button 32 expose out of the cavity 15. The ribs 322 are pressed towards the cavity 15, until the latching portion 321 tightly abuts against the clamping portion 211, thus the battery cover 20 is tightly locked to the body member 10.

To release the battery cover 20 from the body member 10, the pivoting shaft 31 is rotated about the mounting portion 313 until the latching portion 321 is separated from the clamping portion 211. Then the battery cover 20 is pushed towards the bottom portion 12 of the body member 10 until the tabs 212 are released from the first limiting slots 111, and the limiting blocks 213 are released from the second limiting slots 121.

The battery cover latching mechanism 100 can tightly lock the battery cover 20 to the body member 10 using the button assembly 30, and also facilitating opening operation of the battery cover 20 without any breakage.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A battery cover latching mechanism, comprising:
a body member defining a battery receiving space and a cavity, two protrusions formed in the cavity and defining a latching slot therebetween;
a battery cover being attached to the body member to cover the battery receiving space, the battery cover including a clamping portion; and
a button assembly including a button and a connecting member, the button having a latching portion, the button being rotatably mounted to the connecting member, the connecting member rotatably received in the latching slot of the body member, the latching portion releasable locking with the clamping portion.

2. The battery cover latching mechanism as claimed in claim 1, wherein the connecting member includes a head portion, a first connecting portion, a mounting portion, a second connecting portion, and a tail portion, the mounting portion connects one end of the first connecting portion and one end of the second connecting portion together, the head portion connects to the other end of the first connecting portion, the tail portion perpendicularly connects to the other end of the second connecting portion towards the head portion, the head portion and the tail portion are rotatably mounted to the button, such that the button rotates about the head portion and the tail portion, the connecting member rotates about the mounting portion together with the button.

3. The battery cover latching mechanism as claimed in claim 2, wherein the button includes the latching portion formed at one end thereof, and two ribs formed at an opposite end, each rib defines a pivoting hole, the head portion and the tail portion are respectively inserted into a pivoting hole.

4. The battery cover latching mechanism as claimed in claim 2, wherein the cavity is surrounded by a bottom wall and a sidewall, the protrusions protruding from the bottom wall.

5. The battery cover latching mechanism as claimed in claim 4, wherein the latching slot includes a pivoting slot and an inserting slot communicating with the pivoting slot, the mounting portion is inserted into the pivoting slot through the inserting slot.

6. The battery cover latching mechanism as claimed in claim 4, wherein the sidewall defines a concave surface communicating with the cavity, the button defines a notch, the notch cooperates with the concave surface to facilitate catching the button assembly.

7. The battery cover latching mechanism as claimed in claim 1, wherein the battery cover includes limiting blocks, the body member includes limiting slots, the limiting blocks respectively latch to the limiting slots.

8. A battery cover latching mechanism, comprising:
a body member,
a battery cover including a clamping portion, the battery cover being attached to the body member; and
a button assembly including a button and a pivoting shaft, the button including a latching portion, the button being rotatably mounted to the pivoting shaft about a first axis and the pivoting shaft being rotatably mounted to the body member about a second axis to lock the latching portion to the clamping portion or release the latching portion from the clamping portion.

9. The battery cover latching mechanism as claimed in claim 8, wherein the pivoting shaft includes a head portion, a first connecting portion, a mounting portion, a second connecting portion, and a tail portion, the mounting portion connects one end of the first connecting portion and one end of the second connecting portion together, the head portion connects to the other end of the first connecting portion, the tail portion perpendicularly connects to the other end of the second connecting portion towards the head portion, the head portion and the tail portion are rotatably mounted to the button, such that the button rotates about the head portion and the tail portion, the pivoting shaft rotates about the mounting portion together with the button.

10. The battery cover latching mechanism as claimed in claim 9, wherein the body member defines a cavity surrounded by a bottom wall and a sidewall, the body member includes two protrusions protruding from the bottom wall, the two protrusions form a latching slot, the mounting portion is rotatably received in the latching slot.

11. The battery cover latching mechanism as claimed in claim 10, wherein the latching slot includes a pivoting slot and an inserting slot communicating with the pivoting slot, the mounting portion is inserted into the pivoting slot through the inserting slot.

12. The battery cover latching mechanism as claimed in claim 10, wherein the sidewall defines a concave surface communicating with the cavity, the button defines a notch, the notch cooperates with the concave surface to facilitate catching the button assembly.

13. The battery cover latching mechanism as claimed in claim 9, wherein the button includes the latching portion formed at one end thereof, and two ribs formed at an opposite end, each rib defines a pivoting hole, the head portion and the tail portion are respectively inserted into a pivoting hole.

14. The battery cover latching mechanism as claimed in claim 8, wherein the battery cover includes limiting blocks, the body member includes limiting slots, the limiting blocks latch to the limiting slots.

15. A battery cover latching mechanism, comprising:
a body member defining a battery receiving space;
a battery cover being attached to the body member to cover the battery receiving space, the battery cover including a clamping portion; and
a button assembly including a button and a connecting member, the button having a latching portion, the connecting member rotatably mounted to the body member, the button being rotatably mounted to the connecting member to releasably lock the latching portion to the clamping portion;
wherein the connecting member includes a head portion, a first connecting portion, a mounting portion, a second connecting portion, and a tail portion, the mounting portion connects one end of the first connecting portion and one end of the second connecting portion together, the head portion connects to the other end of the first connecting portion, the tail portion perpendicularly connects to the other end of the second connecting portion towards the head portion, the head portion and the tail portion are rotatably mounted to the button, such that the button rotates about the head portion and the tail portion, the connecting member rotates about the mounting portion together with the button.

16. The battery cover latching mechanism as claimed in claim 15, wherein the body member defines a cavity surrounded by a bottom wall and a sidewall, the body member includes two protrusions protruding from the bottom wall, the two protrusions form a latching slot, the mounting portion is rotatably received in the latching slot.

17. The battery cover latching mechanism as claimed in claim 16, wherein the latching slot includes a pivoting slot and an inserting slot communicating with the pivoting slot, the mounting portion is inserted into the pivoting slot through the inserting slot.

18. The battery cover latching mechanism as claimed in claim 17, wherein the latching portion is formed at one end of the button, and two ribs formed at an opposite end, each rib defines a pivoting hole, the head portion and the tail portion are respectively inserted into a pivoting hole.

\* \* \* \* \*